United States Patent
Davis et al.

(10) Patent No.: US 12,196,871 B2
(45) Date of Patent: Jan. 14, 2025

(54) TOOL TRACKING SYSTEM

(71) Applicant: MILWAUKEE ELECTRIC TOOL CORPORATION, Brookfield, WI (US)

(72) Inventors: Anthony Davis, Brookfield, WI (US); Chad E. Jones, Jackson, WI (US); John B. Lienau, Glendale, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 994 days.

(21) Appl. No.: 17/050,861

(22) PCT Filed: Aug. 13, 2020

(86) PCT No.: PCT/US2020/046104
§ 371 (c)(1),
(2) Date: Oct. 27, 2020

(87) PCT Pub. No.: WO2021/030547
PCT Pub. Date: Feb. 18, 2021

(65) Prior Publication Data
US 2023/0341500 A1 Oct. 26, 2023

Related U.S. Application Data

(60) Provisional application No. 62/886,115, filed on Aug. 13, 2019.

(51) Int. Cl.
*G01S 5/02* (2010.01)
*G01S 19/34* (2010.01)
*G08B 21/02* (2006.01)

(52) U.S. Cl.
CPC ............ *G01S 5/0231* (2013.01); *G01S 19/34* (2013.01); *G08B 21/023* (2013.01);
(Continued)

(58) Field of Classification Search
None
See application file for complete search history.

(56) References Cited

U.S. PATENT DOCUMENTS 5,241,691 A * 8/1993 Owen .................... H04M 1/733
340/7.38
6,222,484 B1 * 4/2001 Seiple ...................... H01Q 1/22
342/357.55
(Continued)

FOREIGN PATENT DOCUMENTS

CA 2133673 A1 * 4/1996 ............. H04B 7/185
CN 208768308 U 4/2019
WO WO-0023816 A1 * 4/2000 ............. G01S 19/14

OTHER PUBLICATIONS

International Search Report and Written Opinion for Application No. PCT/US2020/046104 dated Nov. 20, 2020 (10 pages).
(Continued)

*Primary Examiner* — Whitney Moore
(74) *Attorney, Agent, or Firm* — Michael Best & Friedrich LLP

(57) ABSTRACT

A beacon transmitter including a wireless transceiver and an electronic controller coupled to the wireless transceiver. The electronic controller is configured to repeatedly transmit, via the wireless transceiver, a first beacon signal through a first number of transmission repetitions spaced at a first repeat interval, and receive an acknowledgement signal via the wireless transceiver. The electronic controller is also configured to stop transmission of the first beacon signal for a first predetermined amount of time based on receipt of the acknowledgement signal, determine that the first predetermined amount of time has expired, and resume repeatedly transmitting, via the wireless transceiver, the first beacon signal in response to determining that the predetermined amount of time has expired.

11 Claims, 11 Drawing Sheets

(52) U.S. Cl.
CPC ..... *G08B 21/0269* (2013.01); *G08B 21/0272* (2013.01); *G01S 2205/002* (2013.01)

(56) References Cited

U.S. PATENT DOCUMENTS

| | | |
|---|---|---|
| 6,321,091 B1 | 11/2001 | Holland |
| 7,016,687 B1 | 3/2006 | Holland |
| 7,124,028 B2 | 10/2006 | Ray et al. |
| 7,181,170 B2 | 2/2007 | Love et al. |
| 7,260,378 B2 | 8/2007 | Holland et al. |
| 7,333,815 B1 | 2/2008 | Holland |
| 7,346,015 B2 | 3/2008 | Shipman |
| 7,349,705 B1 | 3/2008 | Holland |
| 7,359,358 B2 | 4/2008 | Shipman |
| 7,379,729 B2 | 5/2008 | Holland et al. |
| 7,446,658 B2 * | 11/2008 | Panotopoulos .... G08B 13/2417 340/10.33 |
| 7,675,410 B2 | 3/2010 | Aritsuka et al. |
| 7,983,847 B2 | 7/2011 | Ray et al. |
| 8,228,759 B2 | 7/2012 | Ray |
| 8,238,934 B2 | 8/2012 | Holland |
| 8,285,247 B2 | 10/2012 | Holland et al. |
| 8,296,068 B2 | 10/2012 | Ray et al. |
| 8,320,939 B1 | 11/2012 | Vincent |
| 8,543,083 B2 | 9/2013 | Holland et al. |
| 8,605,547 B2 | 12/2013 | Ray et al. |
| 8,644,111 B2 | 2/2014 | Ray et al. |
| 8,681,584 B2 | 3/2014 | Ray |
| 8,867,309 B2 | 10/2014 | Ray et al. |
| 8,867,310 B1 | 10/2014 | Ray et al. |
| 8,873,335 B1 | 10/2014 | Ray et al. |
| 8,873,336 B1 | 10/2014 | Ray et al. |
| 8,879,356 B1 | 11/2014 | Ray et al. |
| 8,885,441 B1 | 11/2014 | Ray et al. |
| 9,097,785 B2 | 8/2015 | Holland |
| 9,232,356 B2 | 1/2016 | Holland |
| 9,307,355 B2 | 4/2016 | Nehrenz et al. |
| 9,357,367 B2 * | 5/2016 | Ranki ............... H04W 52/0209 |
| 9,459,360 B2 | 10/2016 | Ray et al. |
| 9,470,809 B2 | 10/2016 | Ray |
| 9,500,757 B2 | 11/2016 | Ray |
| 9,622,208 B2 | 4/2017 | Mycek et al. |
| 9,807,556 B2 | 10/2017 | Holland |
| 9,826,351 B2 | 11/2017 | Klimek et al. |
| 9,826,356 B2 | 11/2017 | Mycek et al. |
| 9,930,486 B2 | 3/2018 | Mycek et al. |
| 9,942,706 B2 | 4/2018 | Klimek et al. |
| 10,028,105 B1 | 7/2018 | Swart |
| 10,136,250 B2 | 11/2018 | Krzych et al. |
| 10,165,046 B2 | 12/2018 | Yang et al. |
| 10,231,078 B1 | 3/2019 | Swart |
| 10,251,020 B1 | 4/2019 | Swart |
| 10,311,352 B2 | 6/2019 | Cannell et al. |
| 10,354,104 B2 | 7/2019 | Swart |
| 10,368,186 B2 | 7/2019 | Stampfl et al. |
| 10,771,917 B2 | 9/2020 | Krzych et al. |
| 2004/0185889 A1 | 9/2004 | Shipman |
| 2005/0014517 A1 | 1/2005 | Holland et al. |
| 2005/0020241 A1 | 1/2005 | Holland et al. |
| 2005/0020280 A1 | 1/2005 | Holland et al. |
| 2005/0020281 A1 | 1/2005 | Holland et al. |
| 2005/0026589 A1 | 2/2005 | Holland et al. |
| 2005/0037773 A1 | 2/2005 | Holland et al. |
| 2005/0048946 A1 | 3/2005 | Holland et al. |
| 2005/0048947 A1 | 3/2005 | Holland et al. |
| 2005/0048948 A1 | 3/2005 | Holland et al. |
| 2007/0111703 A1 | 5/2007 | Holland et al. |
| 2009/0315767 A1 * | 12/2009 | Scalisi ................ G01S 19/34 342/357.74 |
| 2010/0279706 A1 * | 11/2010 | Dicke .................. H04W 4/02 455/456.1 |
| 2014/0370909 A1 | 12/2014 | Natucci, Jr. et al. |
| 2015/0097671 A1 | 4/2015 | Aflen et al. |
| 2016/0370479 A1 | 12/2016 | Ray et al. |
| 2017/0026777 A1 | 1/2017 | Denboer et al. |
| 2017/0280298 A1 | 9/2017 | Mycek et al. |
| 2017/0374629 A1 * | 12/2017 | Ramappa ............ H04W 4/021 |
| 2018/0049000 A1 | 2/2018 | Holland |
| 2018/0143287 A1 | 5/2018 | Dackefjord et al. |
| 2018/0176723 A1 | 6/2018 | Klimek et al. |
| 2018/0176729 A1 | 6/2018 | Mycek et al. |
| 2018/0270303 A1 | 9/2018 | Yang et al. |
| 2018/0286158 A1 | 10/2018 | Dackefjord et al. |
| 2018/0295466 A1 | 10/2018 | Cannell et al. |
| 2018/0295483 A1 | 10/2018 | Jeon |
| 2019/0028952 A1 | 1/2019 | Shah |
| 2019/0037341 A1 | 1/2019 | Krzych et al. |
| 2019/0124475 A1 | 4/2019 | Swart |
| 2019/0141473 A1 | 5/2019 | Swart |
| 2019/0141663 A1 | 5/2019 | Swart |
| 2019/0208468 A1 | 7/2019 | Kaushik |

OTHER PUBLICATIONS

Chinese Patent Office Action for Application No. 202080057531.8 dated Jul. 1, 2023 (32 pages including machine English translation).
Extended European Search Report for Application No. 20851923.1 dated Jul. 4, 2023 (7 pages).
European Patent Office Action for Application No. 20851923.1 dated Jun. 26, 2024 (5 pages).

* cited by examiner

TOOL TRACKING SYSTEM

RELATED APPLICATIONS

This application is a national phase filing under 35 U.S.C. § 371 of International Application No. PCT/US2020/046104, filed Aug. 13, 2020, which claims the benefit of U.S. Provisional Patent Application No. 62/886,115, filed Aug. 13, 2019, the entire content of which is hereby incorporated by reference.

FIELD

The present technology relates to communication and logging of location for tools and other devices.

SUMMARY

In some embodiments, a method for temporarily suspending transmission of a beacon signal is described. The method includes transmitting repeatedly, by a beacon transmitter, a first beacon signal through a first number of transmission repetitions spaced at a first repeat interval. The method also includes receiving, at the beacon transmitter, an acknowledgement signal, and stopping, by the beacon transmitter, transmission of the first beacon signal for a first predetermined amount of time based on receipt of the acknowledgement signal. The method also includes determining, by the beacon transmitter, that the first predetermined amount of time has expired, and resuming repeated transmission, by the beacon transmitter, of the first beacon signal based on determining that the predetermined amount of time has expired.

In some embodiments, the acknowledgement signal is transmitted by a personal wireless device.

In some embodiments, the personal wireless device transmits the acknowledgement signal based on receiving the first beacon signal.

In some embodiments, the predetermined time is at least sixty seconds.

In some embodiments, the predetermined time is based on a power supply coupled to the beacon transmitter.

In some embodiments, the method further includes determining, by the beacon transmitter, a location of the beacon transmitter based on signals received from global navigation satellites. The beacon transmitter further transmits, periodically, a location beacon signal at a second repeat interval that is longer than the first repeat interval, the location beacon signal including the location of the beacon transmitter. The beacon transmitter further stops transmission of the location beacon signal for a second predetermined amount of time based on the acknowledgement signal, and determines that the second predetermined amount of time has expired. The beacon transmitter resumes periodic transmission of the location beacon signal based on determining the second predetermined amount of time has expired.

In some embodiments, the first beacon signal is transmitted according to a first protocol and at a first power level, and the location beacon signal is transmitted according to a second protocol and at a second power level, where the first protocol is different than the second protocol, and where the first power level is lower than the second power level.

In some embodiments, resuming periodic transmission, by the beacon transmitter includes again transmitting periodically, by the beacon transmitter, the location beacon signal at the second repeat interval.

In one embodiment, a beacon transmitter is described. The beacon transmitter includes a wireless transceiver and an electronic controller coupled to the wireless transceiver. The electronic controller is configured to repeatedly transmit, via the wireless transceiver, a first beacon signal through a first number of transmission repetitions spaced at a first repeat interval, and receive an acknowledgement signal via the wireless transceiver. The electronic controller is also configured to stop transmission of the first beacon signal for a first predetermined amount of time based on receipt of the acknowledgement signal, determine that the first predetermined amount of time has expired, and resume repeatedly transmitting, via the wireless transceiver, the first beacon signal in response to determining that the predetermined amount of time has expired.

In some embodiments, the acknowledgement signal is transmitted by a personal wireless device.

In some embodiments, the personal wireless device transmits the acknowledgement signal in response to receiving the first beacon signal.

In some embodiments, the acknowledgment signal comprises a beacon ID value associated with the transmitted first beacon signal.

In some embodiment, the first predetermined time is based on a capacity of a power supply of the beacon signal.

In some embodiments, the electronic controller is also configured to determine a location of the beacon transmitter based on signals received from global navigation satellites, and transmit periodically a location beacon signal at a second repeat interval that is longer than the first repeat interval. The location beacon signal includes the location of the beacon transmitter. The electronic controller is also configured to stop transmission of the location beacon signal for a second predetermined amount of time in response to receiving the acknowledgement signal, determine that the second predetermined amount of time has expired, and resume periodic transmission of the location beacon signal in response to determining that the second predetermined amount of time has expired.

In some embodiments, the first beacon signal is transmitted according to a first protocol and at a first power level, and the location beacon signal is transmitted according to a second protocol and at a second power level. The first protocol is different than the second protocol and the first power level is less than the second power level.

In one embodiment, a method for controlling transmission of a beacon signal from a beacon transmitter is described. The method includes transmitting repeatedly, by a beacon transmitter, a first beacon signal through a first number of transmission repetitions spaced at a first repeat interval. The method also includes receiving, at the beacon transmitter, an acknowledgement signal, and stopping, by the beacon transmitter, transmission of the first beacon signal for a first predetermined amount of time based on receipt of the acknowledgement signal. The method also includes determining, by the beacon transmitter, that the first predetermined amount of time has expired, and resuming repeated transmission, by the beacon transmitter, of the first beacon signal based on determining that the predetermined amount of time has expired. The method also includes determining, by the beacon transmitter, a location of the beacon transmitter based on signals received from global navigation satellites, and transmitting periodically, by the beacon transmitter, a location beacon signal at a second repeat interval that is longer than the first repeat interval. The location beacon signal includes the location of the beacon transmitter.

In some embodiments, the method also includes stopping transmission, by the beacon transmitter of the location beacon signal for a second predetermined amount of time based on the received acknowledgment signal, and determining, by the beacon transmitter, that the second predetermined amount of time has expired. The method also includes resuming period transmission, by the beacon transmitter, of the location beacon signal based on determining that the second predetermined amount of time has expired.

In some embodiments, the acknowledgement signal is transmitted by a personal wireless device.

In some embodiments, the personal wireless device transmits the acknowledgement signal based on receiving the first beacon signal.

In some embodiments, the first predetermined time is based on a capacity of a power supply coupled to the beacon transmitter.

Before any embodiments are explained in detail, it is to be understood that the embodiments are not limited in its application to the details of the configuration and arrangement of components set forth in the following description or illustrated in the accompanying drawings. The embodiments are capable of being practiced or of being carried out in various ways. Also, it is to be understood that the phraseology and terminology used herein are for the purpose of description and should not be regarded as limiting. The use of "including," "comprising," or "having" and variations thereof are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

In addition, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic-based aspects may be implemented in software (e.g., stored on non-transitory computer-readable medium) executable by one or more processing units, such as a microprocessor and/or application specific integrated circuits ("ASICs"). As such, it should be noted that a plurality of hardware and software based devices, as well as a plurality of different structural components, may be utilized to implement the embodiments. For example, "servers," "computing devices," "controllers," "processors," etc., described in the specification can include one or more processing units, one or more computer-readable medium modules, one or more input/output interfaces, and various connections (e.g., a system bus) connecting the components.

Relative terminology, such as, for example, "about," "approximately," "substantially," etc., used in connection with a quantity or condition would be understood by those of ordinary skill to be inclusive of the stated value and has the meaning dictated by the context (e.g., the term includes at least the degree of error associated with the measurement accuracy, tolerances [e.g., manufacturing, assembly, use, etc.] associated with the particular value, etc.). Such terminology should also be considered as disclosing the range defined by the absolute values of the two endpoints. For example, the expression "from about 2 to about 4" also discloses the range "from 2 to 4". The relative terminology may refer to plus or minus a percentage (e.g., 1%, 5%, 10%, or more) of an indicated value.

It should be understood that although certain drawings illustrate hardware and software located within particular devices, these depictions are for illustrative purposes only. Functionality described herein as being performed by one component may be performed by multiple components in a distributed manner. Likewise, functionality performed by multiple components may be consolidated and performed by a single component. In some embodiments, the illustrated components may be combined or divided into separate software, firmware and/or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable communication links. Similarly, a component described as performing particular functionality may also perform additional functionality not described herein. For example, a device or structure that is "configured" in a certain way is configured in at least that way but may also be configured in ways that are not explicitly listed.

Other aspects of the technology will become apparent by consideration of the detailed description and accompanying drawings.

DETAILED DESCRIPTION

Figure 1A:
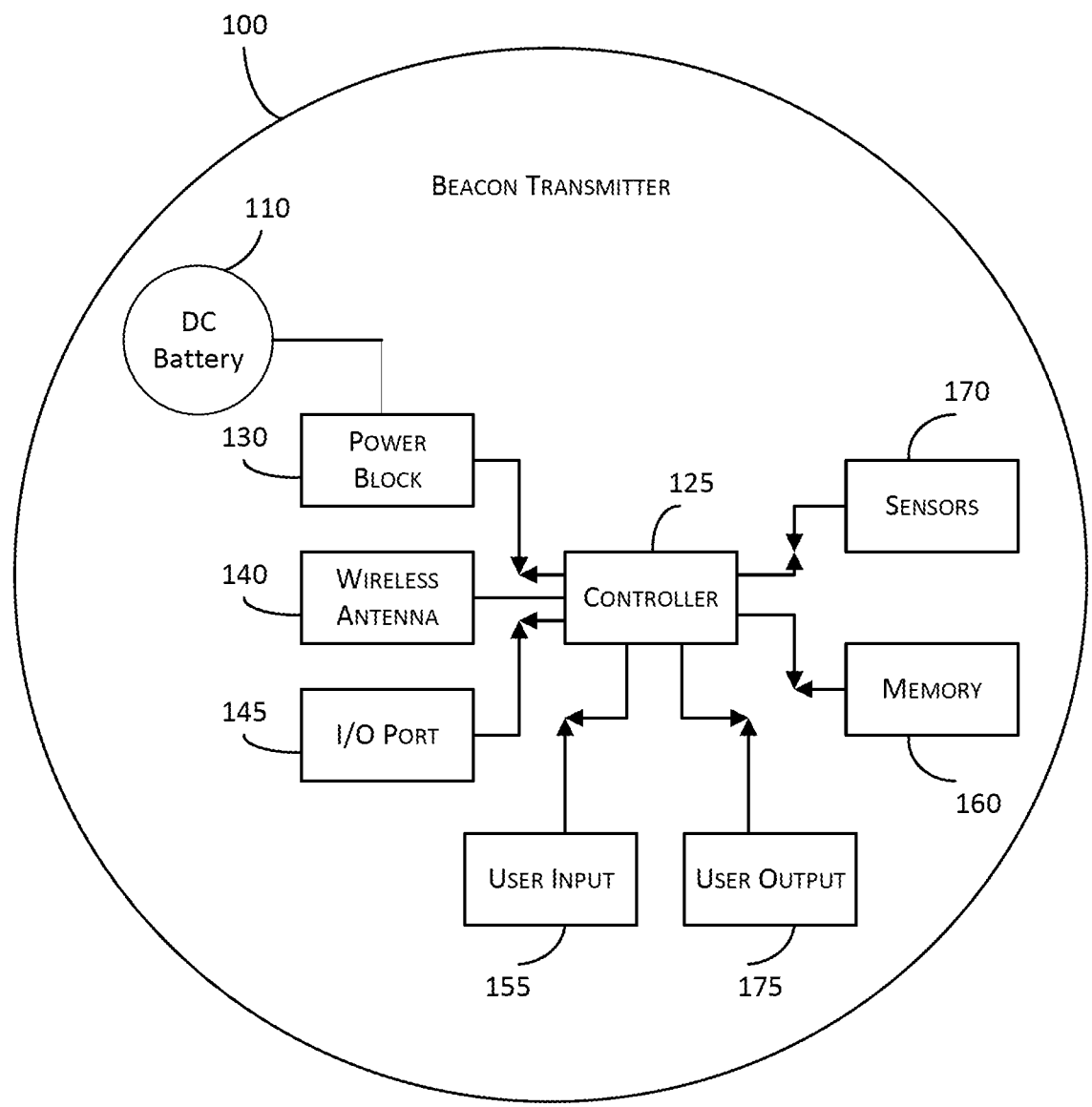
FIG. 1A illustrates a diagram of a beacon transmitter for location reporting, according to some embodiments.

FIG. 1A illustrates a beacon transmitter 100 for location reporting according to embodiments of the technology. The beacon transmitter 100, also referred to as a transmitting device, includes a battery 110 (also referred to as a power source), a controller 125, a power block 130, a wireless transceiver 140, an input/output (I/O) port 145, a memory 160, user input 155, sensors 170, and a user output 175. As described in further detail below, the beacon transmitter repeatedly transmits, via the wireless transceiver 140, a first beacon signal and a second advertising beacon signal according to a transmission pattern, which, in some embodiments, enables power-efficient location tracking of the beacon transmitter 100 and objects to which it is attached.

The battery 110 provides direct current (DC) power to the power block 130. The battery 110 includes a housing within which is one or more battery cells, such as lithium ion ("Li-ion") cells, Nickel-Cadmium ("Ni-Cad") cells, or cells of another chemistry type. In some embodiments, the battery 110 is a coin cell battery. In some embodiments, the beacon transmitter 100 includes another power source in addition to the battery 110 or in place of the battery 110, such as a circuit for connection to alternating current power (e.g., including a rectifier), photovoltaic cells and related circuitry for solar-based power generation, a wind-based power generator, or a kinetic energy power generator.

The power block 130 is coupled to the battery 110 via the terminals (not shown) of the battery 110 and matching terminals (not shown) of the power block 130. The power block 130 provides DC power to components of the beacon transmitter 100. The power block 130 may include power regulating and conversion circuitry to ensure that the power provided to various components of the beacon transmitter 100 is at the appropriate level(s).

The controller 125 is further coupled to the wireless transceiver 140 and the input/output (I/O) port 145. As will be described in greater detail below, the power block 130, wireless transceiver 140, and I/O port 145 enable the beacon transmitter 100 to communicate with external devices and may be collectively referred to as a physical interface.

The controller 125, which may be an electronic processor, is in communication with the memory 160. In some embodiments, the memory 160 stores and provides to the controller 125 for transmission the data making up the first beacon signal and the second advertising beacon signal, which are described in further detail below. The memory 160 further includes, among other elements, instructions that are executed by the controller 125 to control the functions of the beacon transmitter 100 described herein. Although the instructions are described as software stored in memory 160 and executed by the controller 125, the instructions may be implemented in part or wholly in hardware of the controller 125 or outside of the controller 125. For example, the instructions may be implemented by one or more separate digital signal processors (DSPs) or general purpose processors executing the instructions, or by one or more field programmable gate arrays (FPGAs) or application specific integrated circuits (ASICs). Although the memory 160 is shown as a singular unit, the memory 160 may be made up of various memories individually coupled to the controller 125 or coupled to the controller 125 via a bus. Additionally, portions of the memory 160 may be embedded within the controller 125. For instance, parameters such as a status of battery 110 may be stored within a memory of the controller 125. The data stored in the memory 160 described herein may be provided from an external computing device via the wireless transceiver 140 or I/O port 145 and stored in the memory 160 by the controller 125.

The user input 155 and sensors 170 include one or more of buttons, microphones, accelerometers, temperature sensors, humidity sensors, and light sensors capable of detecting external stimuli from the environment or the user. The user output 175 includes one or more of LEDs, a speaker, a vibrating element, etc., to inform the user of the status of the beacon transmitter 100. For example, when an error occurs, such as low battery power, the beacon transmitter 100 may output an audible alert, an LED may flash, and/or the vibrating element may provide tactile feedback to the user. The user output 175 may be controlled by output signals from the controller 125.

The controller 125 is further coupled to the wireless transceiver 140 and the I/O port 145. As described in further detail below, the controller 125 may transmit wireless communications via the wireless transceiver 140 and may receive wireless communications via the wireless transceiver 140. The I/O port 145 may include a wired connection for the beacon transmitter 100 to enable, for example, programming of the beacon transmitter 100 or data export from the beacon transmitter 100. In some embodiments, the wireless transceiver 140 is configured to transmit and receive the wireless communications in accordance with Bluetooth and/or Bluetooth low energy ("BLE") protocols, or other short-range wireless protocols. In some embodiments, additionally or alternatively, the wireless transceiver 140 is configured to communicate via cellular communications (e.g. 3G, 4G, 5G, LTE, CDMA, etc.), or other applicable communication protocols. In some embodiments, the wireless transceiver 140 is also configured to receive positional data, such as satellite positional data (e.g., GPS). In some embodiments, the cellular and/or positional data may only be available where the beacon transmitter 100 is integrated into another device, such as a power tool as described below, where there is additional power available, such as via the power tool battery pack.

Figure 1B:
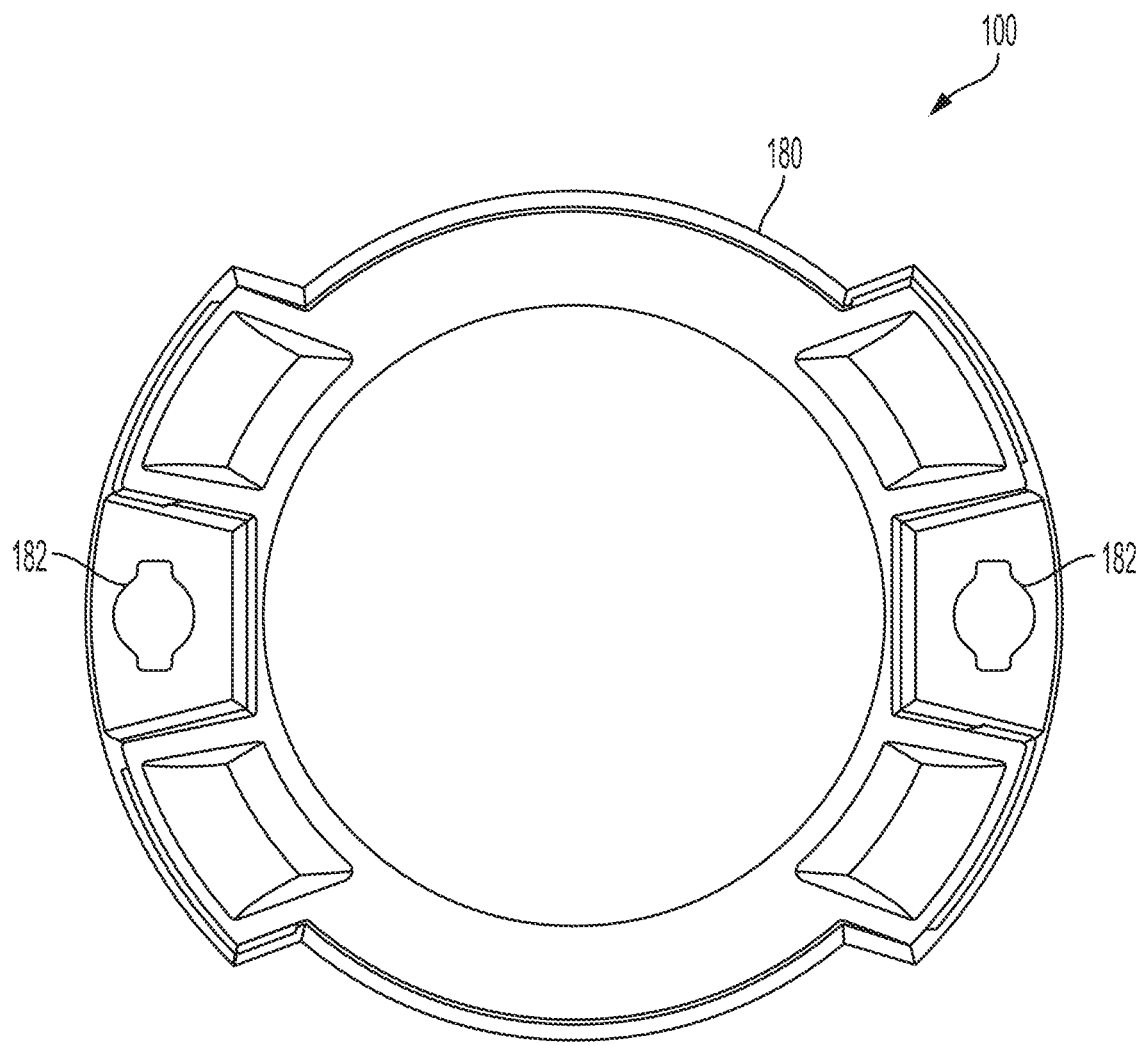
FIG. 1B illustrates a front view of a beacon transmitter, according to some embodiments.

FIG. 1B illustrates an embodiment of the beacon transmitter 100 including a housing 180 with mounting holes 182. The various components of the beacon transmitter 100 illustrated in FIG. 1A are located within and supported by the housing 180. The mounting holes 182 are configured to receive fasteners (e.g., screws) to secure the beacon transmitter 100 to an object to be tracked. Other securing elements are used in some embodiments, such as an adhesive pad on the back of the housing 180 (not shown). In some embodiments, the beacon transmitter 100 includes a housing having one or more of a different shape, differently positioned mounting holes, and different elements for mounting to objects.

Figure 2:
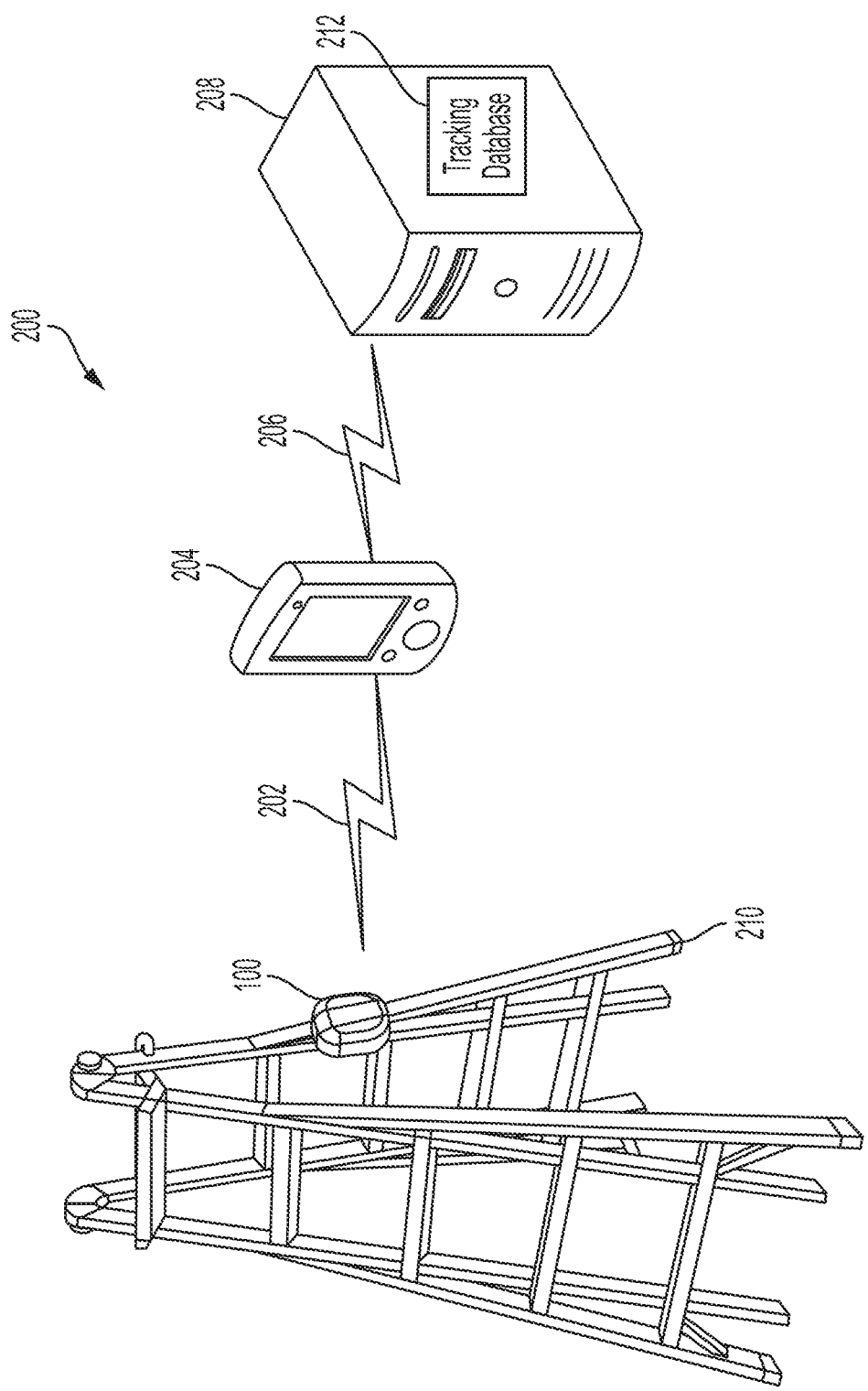
FIG. 2 illustrates an object location tracking system including the beacon transmitter of FIGS. 1A-1B attached to an object, according to some embodiments.

FIG. 2 depicts an object location tracking system 200 including the beacon transmitter 100 attached to an object 210, illustrated as a ladder. In some embodiments, the beacon transmitter 100 is secured to the object 210 using an adhesive, hook and loop fasteners, or the like, rather than via fasteners through the mounting holes 182. The beacon transmitter 100 communicates via wireless signals 202 (e.g., Bluetooth™ low energy transmissions) with a personal wireless device 204 configured to receive such signals. The personal wireless device 204 (also referred to as a receiving device) may be, for example, a mobile smart phone, laptop computer, desktop computer, personal digital assistant (PDA), or other receiving device. Personal wireless device 204 communicates via a network 206 with a location server 208. Example computer systems that may implement personal wireless device and location server 208 are discussed below with respect to FIG. 4. The network 206 may include one more of a local area network (LAN), wide area network (WAN) (e.g., the Internet), a cellular network, or other networks.

In some embodiments, the beacon transmitter 100 is integrated within an object to be tracked. For example, with respect to FIGS. 3A-3B, the beacon transmitter 100 is integrated into a power tool 300, which is described in further detail below.

As described in further detail below, the personal wireless device 204 receives beacon data from the beacon transmitter 100 via the wireless signals 202. The beacon data may include one or more of a transmitter identifier, a user identifier, user contact information, timestamp, state of charge of the battery 110, an object identifier (identifying the object 210), and other status information. In turn, the personal wireless device 204 (a) logs the beacon data locally on a memory of the personal wireless device 204, (b) sends tracking data, based on the beacon data, to the location server 208 for logging, or (c) both logs the beacon data and sends the tracking data.

The location server 208 includes a tracking database 212. A tracking application may be executed by a processor of the location server 208 to receive tracking data from the personal wireless device 204, update the tracking database 212, and to receive and respond to database queries for the tracking database 212. The tracking database 212 stores tracking data for the beacon transmitter 100 including one or more of a transmitter identifier, a user identifier (e.g., an owner of the beacon transmitter 100), user contact information, timestamp, last known location, state of charge of the battery 110, other status information, personal wireless device identifier (e.g., identifying the most recent personal wireless device 204 that received communications from the beacon transmitter and communicated to the location server 208), and location history (e.g., including previous known locations, timestamps, and personal wireless device identifiers). The tracking database 212 also stores a lost/not-lost indication (e.g., a flag) that indicates, based on a value of the indicator, whether the beacon transmitter 100 is considered "lost" or "not lost."

Although a single beacon transmitter 100 is illustrated in FIG. 2, in some embodiments, the system 200 includes a plurality of beacon transmitters 100, each used to track a different object. Similarly, although a single personal wireless device 204 is illustrated in FIG. 2, in some embodiments, the system 200 includes a plurality of personal wireless devices 204 that may each receive wireless signals 202 from one or more of the personal wireless devices 204 and that may each communicate with the location server 208 over the network 206 or another network. Accordingly, the tracking database 212 stores and updates tracking data for each beacon transmitter 100 in the system 200 based on communications from the one or more personal wireless devices 204.

Although the location server 208 is illustrated as a singular unit, the location server 208 may be made up of various servers located together or remotely and coupled via one or more networks. Similarly, the tracking database 212 may be a single database or made up of various databases in communication with one another.

Although the object 210 is illustrated in FIG. 2 as being a ladder, the beacon transmitter 100 may be mounted on various other objects including other types of tools and accessories. For example, the beacon transmitter 100 may be mounted on and used with hand tools, power tools, test and measurement equipment, battery packs, vacuum cleaners, work site radios, outdoor power equipment, and vehicles. Other tools on which versions of the beacon transmitter 100 may be mounted include drills, circular saws, jig saws, band saws, reciprocating saws, screw drivers, angle grinders, straight grinders, hammers, multi-tools, impact wrenches, rotary hammers, impact drivers, angle drills, pipe cutters, grease guns, and the like. Test and measurement equipment can include digital multimeters, clamp meters, fork meters, wall scanners, IR thermometers, laser distance meters, laser levels, remote displays, insulation testers, moisture meters, thermal imagers, inspection cameras, and the like. Vacuum cleaners can include stick vacuums, hand vacuums, upright vacuums, carpet cleaners, hard surface cleaners, canister vacuums, broom vacuums, and the like. Outdoor power equipment can include blowers, chain saws, edgers, hedge trimmers, lawn mowers, trimmers, and the like. Other tools on which versions of the transmitter may be mounted include devices such as electronic key boxes, calculators, cellular phones, head phones, cameras, motion sensing alarms, flashlights, worklights, weather information display devices, a portable power source, a digital camera, a digital music player, a radio, and multi-purpose cutters.

Figure 3A:
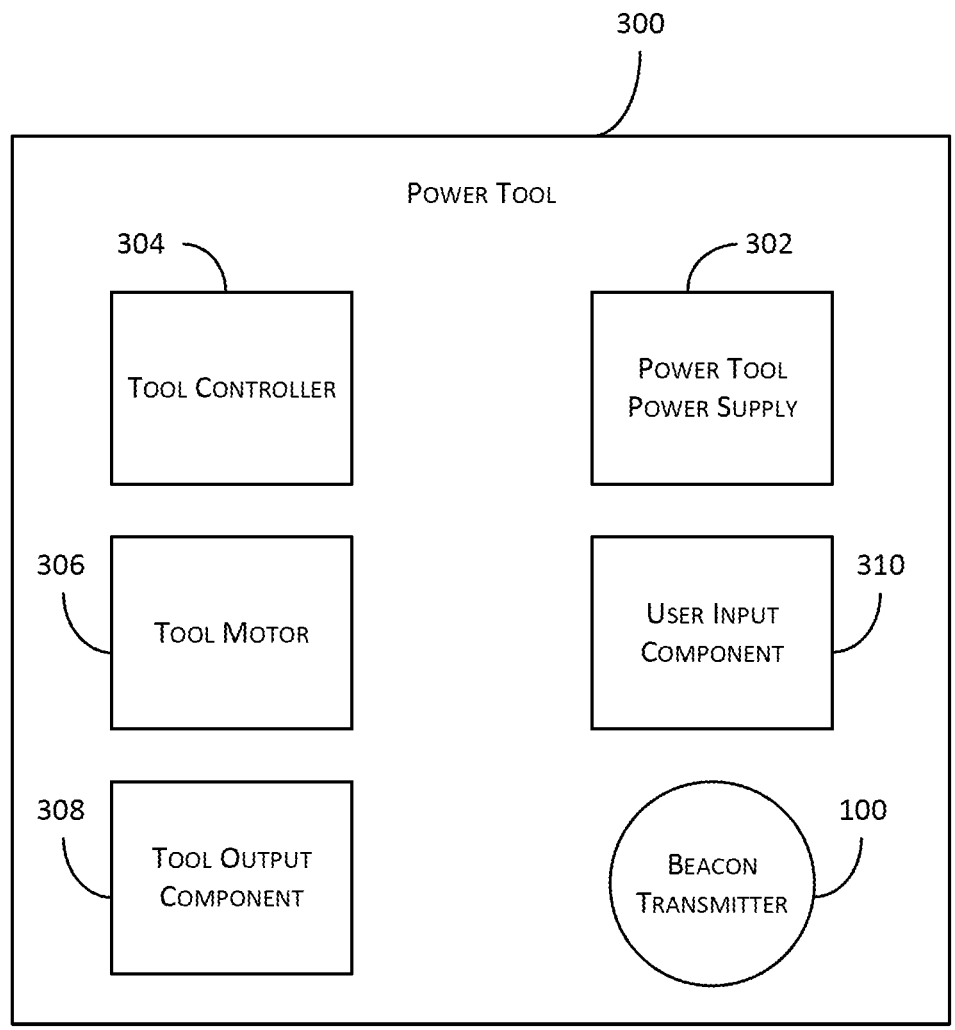
FIGS. 3A-3B illustrate an example power tool incorporating the beacon transmitter of FIG. 1A for location reporting, according to some embodiments.
Figure 3B:
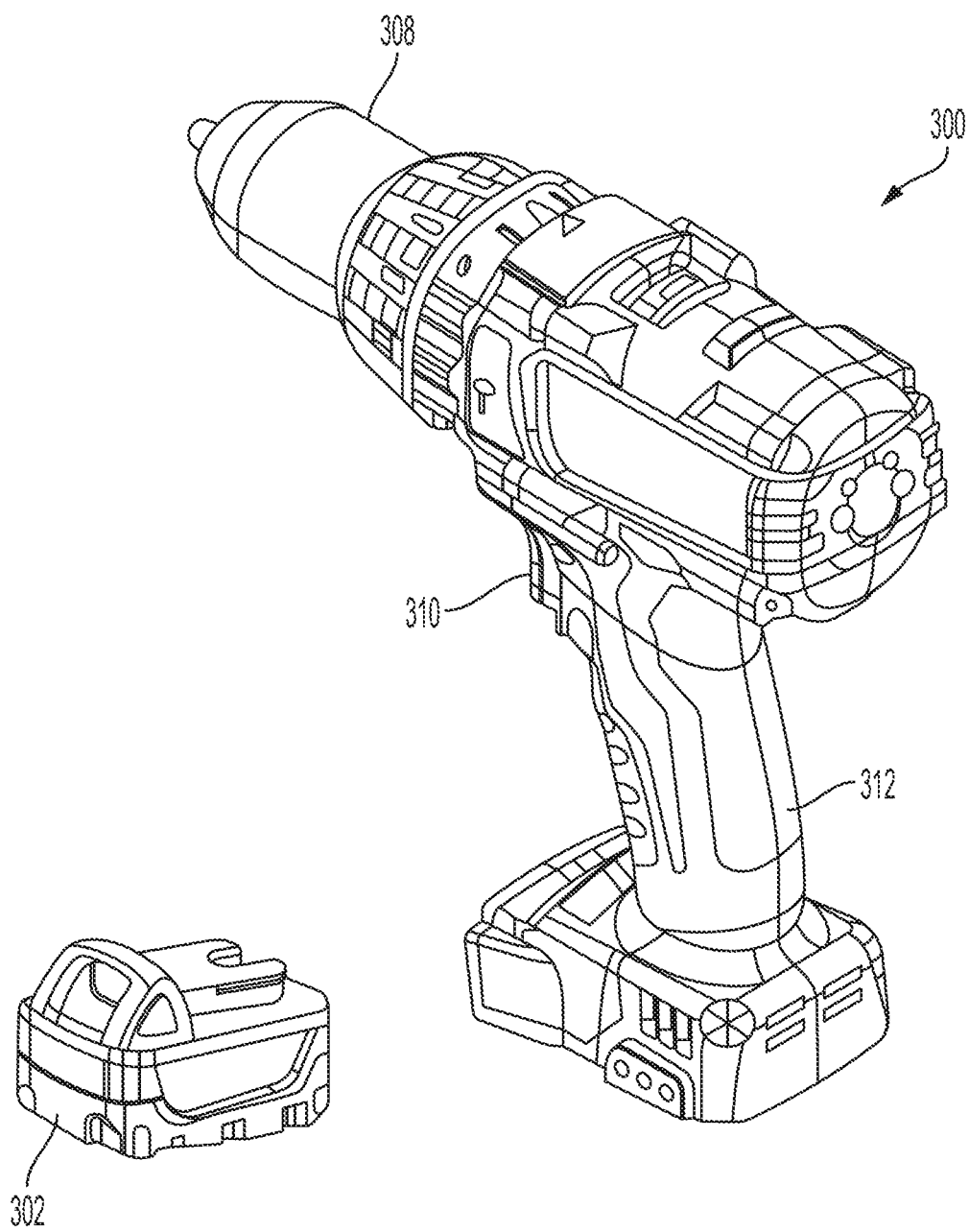

FIGS. 3A-B illustrate a power tool 300 incorporating the beacon transmitter 100 described above. The power tool 300 includes a power tool battery pack or other power tool power supply 302, a tool controller 304, a tool motor 306, and a tool output component 308. The power tool power supply 302 may include a circuit for connection to alternating current power, may include power generation components, such as a wind or solar generator, or may be a battery pack that may include one or more battery cells (e.g., lithium-ion cells) within a housing that includes contacts and an attachment mechanism for selectively securing and removing the power tool battery pack to the power tool 300. The tool controller 304 is coupled to and powered by the power tool power supply 302 and controls the tool motor 306 to drive the tool output component 308. The tool output component 308 may be, for example, a drill chuck, as illustrated in FIG. 3B. The tool controller 304 may control the tool motor 306 based on user input received via user input component 310, which may be, for example, a trigger, as illustrated in FIG. 3B. The power tool 300 may further include a tool housing 312 (FIG. 3B) that houses the tool controller 304, the tool motor 306, and the beacon transmitter 100.

The beacon transmitter 100 may be coupled to the tool controller 304 and the power tool power supply 302. For example, the beacon transmitter 100 may be powered by the power tool power supply 302 when present, and by the battery 110 of the beacon transmitter 100 when the power tool power supply 302 is not coupled to the power tool 300. Additionally, the beacon transmitter 100 may communicate with the tool controller 304 to, for example, (i) obtain tool usage data stored on a memory of the tool controller 304 (e.g., obtained by sensors of the power tool 300) to send to the personal wireless device 204 and/or (ii) provide tool configuration data (e.g., that is sent to the tool controller 304 for storage on a memory thereof) received from the personal wireless device 204. The beacon transmitter 100, when incorporated into the power tool 300, may store within the memory 160 (see FIG. 1) identifying information for the power tool 300, such as a product identifier (e.g., identifying the type of power tool) and a serial number (e.g., uniquely identifying the particular instance of the power tool). This identifying information of the power tool 300 may also be provided by the beacon transmitter 100 as part of the beacon data transmitted with the second advertising beacon signal, described below.

The power tool 300, as illustrated in FIG. 3B, is a hammer drill/driver. However, the power tool 300 is merely an example, and other power tools may have the beacon transmitter 100 incorporated therein. Additionally, other devices may have the beacon transmitter 100 incorporated therein, such as test and measurement equipment, battery packs (e.g., the power tool power supply 302), vacuum cleaners, work site radios, work site lights, outdoor power equipment, and vehicles. Such an incorporated beacon transmitter 100 may be powered by a battery of the device in which the beacon transmitter 100 is incorporated, similar to that which is described with respect to the power tool 300.

Further, in some embodiments, the beacon transmitter 100 is incorporated into a repeater device that receives other beacon signals (e.g., similar to the beacon signals emitted by the beacon transmitter 100) and repeats (i.e., transmits) those beacon signals using beaconing techniques as described herein.

Figure 4:
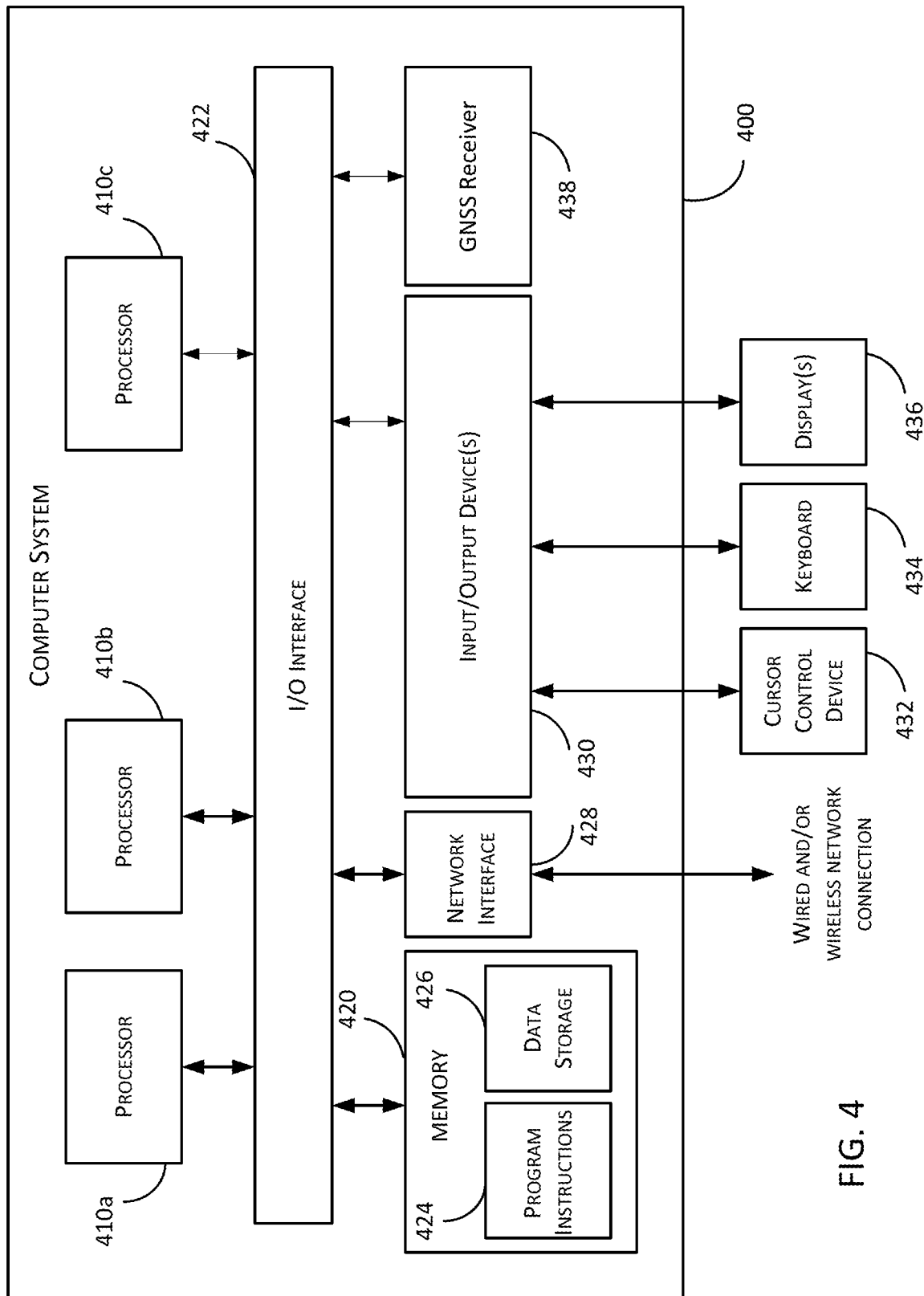
FIG. 4 illustrates an example computer system for implementing location reporting, according to some embodiments.

Embodiments of location logging module and/or of the various location logging methods and techniques as described herein may be executed on one or more computer systems, which may interact with various other devices. One such computer system 400 is illustrated in FIG. 4. In different embodiments, computer system 400 may be any of various types of devices, including, but not limited to, a personal computer system, desktop computer, laptop, notebook, or netbook computer, mainframe computer system, handheld computer, mobile telephone, workstation, network computer, a camera, a set top box, a mobile device, a consumer device, video game console, handheld video game device, application server, storage device, a peripheral device such as a switch, modem, router, or another type of computing or electronic device. The computer system 400 is an example of a computer system that may be configured to implement the location server 208, and of a computer system that may be configured to implement the personal wireless device 204.

In the illustrated embodiment, the computer system 400 includes one or more processors 410 coupled to a system memory 420 via an input/output (I/O) interface 422. Computer system 400 further includes a network interface 428 coupled to I/O interface 422, and one or more input/output devices 430, such as cursor control device 432, keyboard 434, and display(s) 436. In some embodiments, it is contemplated that embodiments may be implemented using a single instance of computer system 400, while in other embodiments multiple such systems, or multiple nodes making up computer system 400, may be configured to host different portions or instances of embodiments. For example, in one embodiment some elements may be implemented via one or more nodes of computer system 400 that are distinct from those nodes implementing other elements.

In various embodiments, computer system 400 may be a uniprocessor system including one processor 410, or a multiprocessor system including several processors 410 (e.g., two, four, eight, or another suitable number). Processors 410 may be any suitable processor capable of executing instructions. For example, in various embodiments, processors 410 may be general-purpose or embedded processors implementing any of a variety of instruction set architectures (ISAs), such as the x86, PowerPC, SPARC, or MIPS ISAs, or any other suitable ISA. In multiprocessor systems, each of processors 410 may commonly, but not necessarily, implement the same ISA.

In some embodiments, at least one processor 410 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the image processing methods disclosed herein may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 420 may be configured to store program instructions and/or data accessible by processor 410. In various embodiments, system memory 420 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for various embodiments, are shown stored within system memory 420 as program instructions 424 and data storage 426, respectively. In other embodiments, program instructions and/or data may be received, sent or stored upon different types of computer-accessible media or on similar media separate from system memory 420 or computer system 400. Generally speaking, a computer-accessible medium may include storage media or memory media such as magnetic or optical media, e.g., disk or CD/DVD-ROM coupled to computer system 400 via I/O interface 422. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 428.

In one embodiment, I/O interface 422 may be configured to coordinate I/O traffic between processor 410, system memory 420, and any peripheral devices in the device, including network interface 428 or other peripheral interfaces, such as input/output devices 430. In some embodiments, I/O interface 422 may perform any necessary protocol, timing or other data transformations to convert data signals from one component (e.g., system memory 420) into a format suitable for use by another component (e.g., processor 410). In some embodiments, I/O interface 422 may include support for devices attached through various types of peripheral buses, such as a variant of the Peripheral Component Interconnect (PCI) bus standard or the Universal Serial Bus (USB) standard, for example. In some embodiments, the function of I/O interface 422 may be split into two or more separate components, such as a north bridge and a south bridge, for example. In addition, in some embodiments some or all of the functionality of I/O interface 422, such as an interface to system memory 420, may be incorporated directly into processor 410.

Network interface 428 may be configured to allow data to be exchanged between computer system 400 and other devices attached to a network, such as other computer systems, or between nodes of computer system 400. In various embodiments, network interface 428 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

For example, when the computer system 400 implements the personal wireless device 204, the network interface 428 may include one or more wireless antennas to enable wireless communication with the beacon transmitter 100 and the location server 208. Additionally, when the computer system 400 implements the location server 208, the network interface 428 may include one or more wireless antennas to enable wireless communication with the personal wireless device 204.

Input/output devices 430 may, in some embodiments, include one or more display terminals, keyboards, keypads, touchpads, scanning devices, voice or optical recognition devices, or any other devices suitable for entering or retrieving data by one or more computer system 400. Multiple input/output devices 430 may be present in computer system 400 or may be distributed on various nodes of computer system 400. In some embodiments, similar input/output devices may be separate from computer system 400 and may interact with one or more nodes of computer system 400 through a wired or wireless connection, such as over network interface 428.

As shown in FIG. 4, the computer system 400 may further include a global navigation satellite system (GNSS) receiver 438. The GNSS receiver 438 is configured to receive signals from global navigation satellites and to determine, based on the received signals, a location of the GNSS receiver 438 (e.g., including a latitude, longitude, and altitude) and time. The GNSS receiver 438 is further configured to provide the determined location and time to other components of the computer system 400, such as the processor(s) 410. When the computer system 400 implements the personal wireless device 204, the determined location and time information may be used as the location and time of the personal wireless device 204 used in the various embodiments described herein. The GNSS receiver may, in some embodiments, be a global positions system (GPS) receiver.

Figure 5:
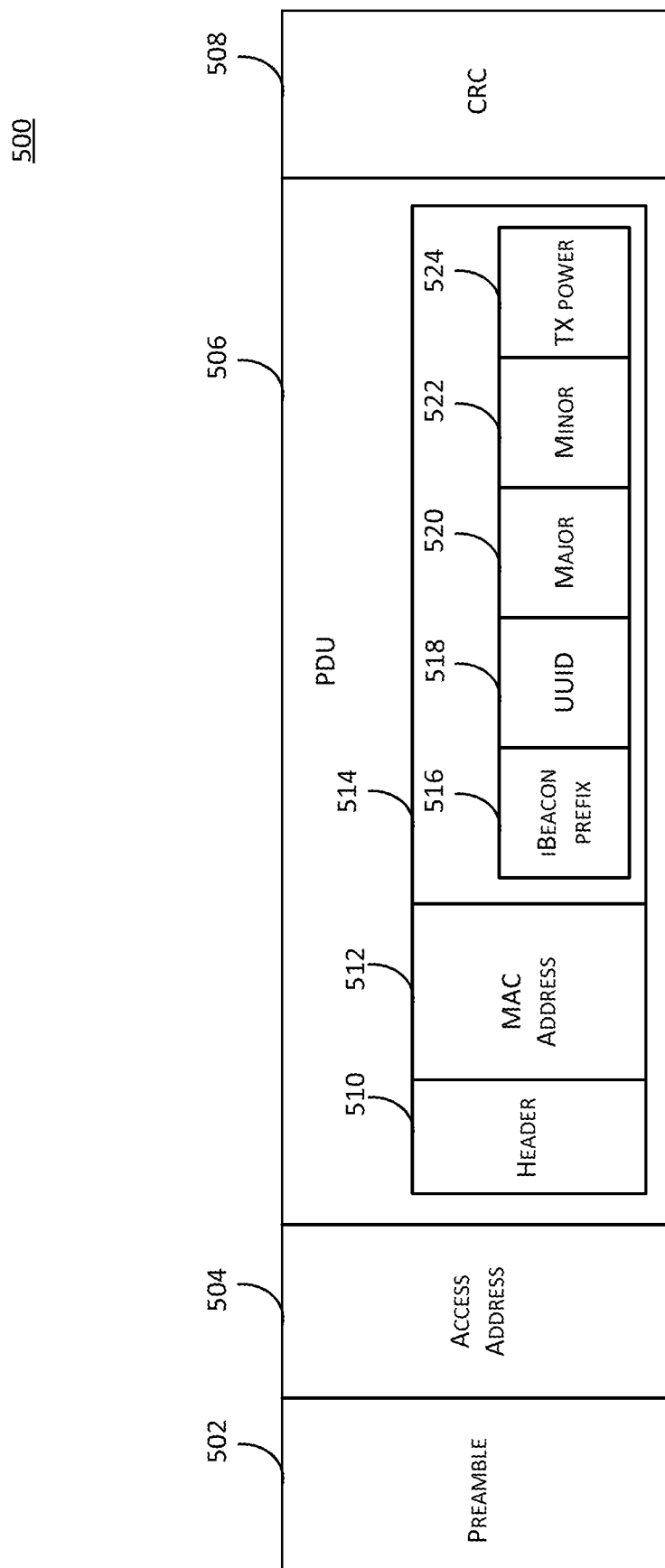
FIG. 5 illustrates a first beacon diagram for a first beacon signal transmittable by a beacon transmitter for location reporting, according to some embodiments.

FIG. 5 depicts a first beacon diagram 500, which represents example contents of the first beacon signals transmitted by the beacon transmitter 100 according to embodiments of the technology. The example first beacon diagram 500 illustrates the iBeacon™ protocol and includes a 47-byte transmission including a 1-byte preamble 502, a 4-byte access address 504, which is generally set to the value 0x8E89BED6, a protocol data unit (PDU) 506 of 2-39 bytes, and a cyclic redundancy check (CRC) 508 of 3 bytes.

PDU 506 includes a header 510 of 2 bytes, a MAC address 512 of 6 bytes, and data 514 of 0-31 bytes. Data 514 includes an iBeacon™ prefix 516 of 9 bytes, a universally unique identifier (UUID) 518 of 16 bytes, a major component 520 of 2 bytes, a minor component 522 of 2 bytes, and a transmission power component 524 of 1 bytes. The UUID 518 may identify, uniquely, the device transmitting the signal (e.g., the beacon transmitter 100). In some embodiments, the first beacon signals may take the form of another open protocol different than that which is illustrated in FIG. 5. For example, the particular fields and the lengths of the fields (e.g., the number of bytes) in the first beacon signals illustrated in FIG. 5 is an example, and some embodiments include additional fields, fewer fields, alternate fields, or fields with different lengths.

Figure 6:
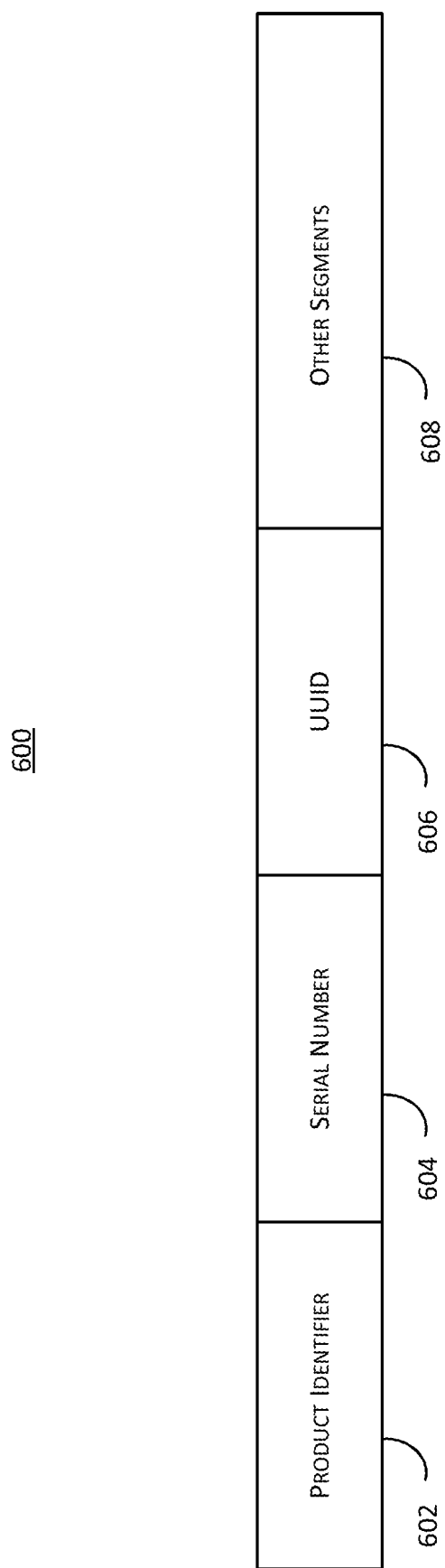
FIG. 6 illustrates a second beacon diagram for a second beacon signal transmittable by a beacon transmitter for location reporting, according to some embodiments.

FIG. 6 depicts a second beacon diagram 600, which represents example contents of the second advertising beacon signals transmitted by the beacon transmitter 100 according to embodiments of the technology. The second beacon diagram 600 has various segments including a uniquely identifying product identifier (ID) 602 that uniquely identifies the type of device transmitting the signal (e.g., the model of the beacon transmitter 100), a serial number 604 that uniquely identifies the particular device from other devices of a similar type, and a universally unique identifier (UUID) 606 that uniquely identifies the particular device transmitting the signal (e.g., the beacon transmitter 100). The second beacon diagram 600 also includes other segments 608 as well, which may include data representing one or more of a user identifier, user contact information, timestamp, state of charge of the battery 110, and other status information. In some embodiments, the second advertising beacon signals may take the form of another proprietary protocol different than that which is illustrated in FIG. 6. For example, the particular fields and the lengths of the fields (e.g., the number of bytes) in the second advertising beacon signals illustrated in FIG. 6 are examples, and some embodiments include additional fields, fewer fields, alternate fields, or fields with different lengths.

Figure 7:
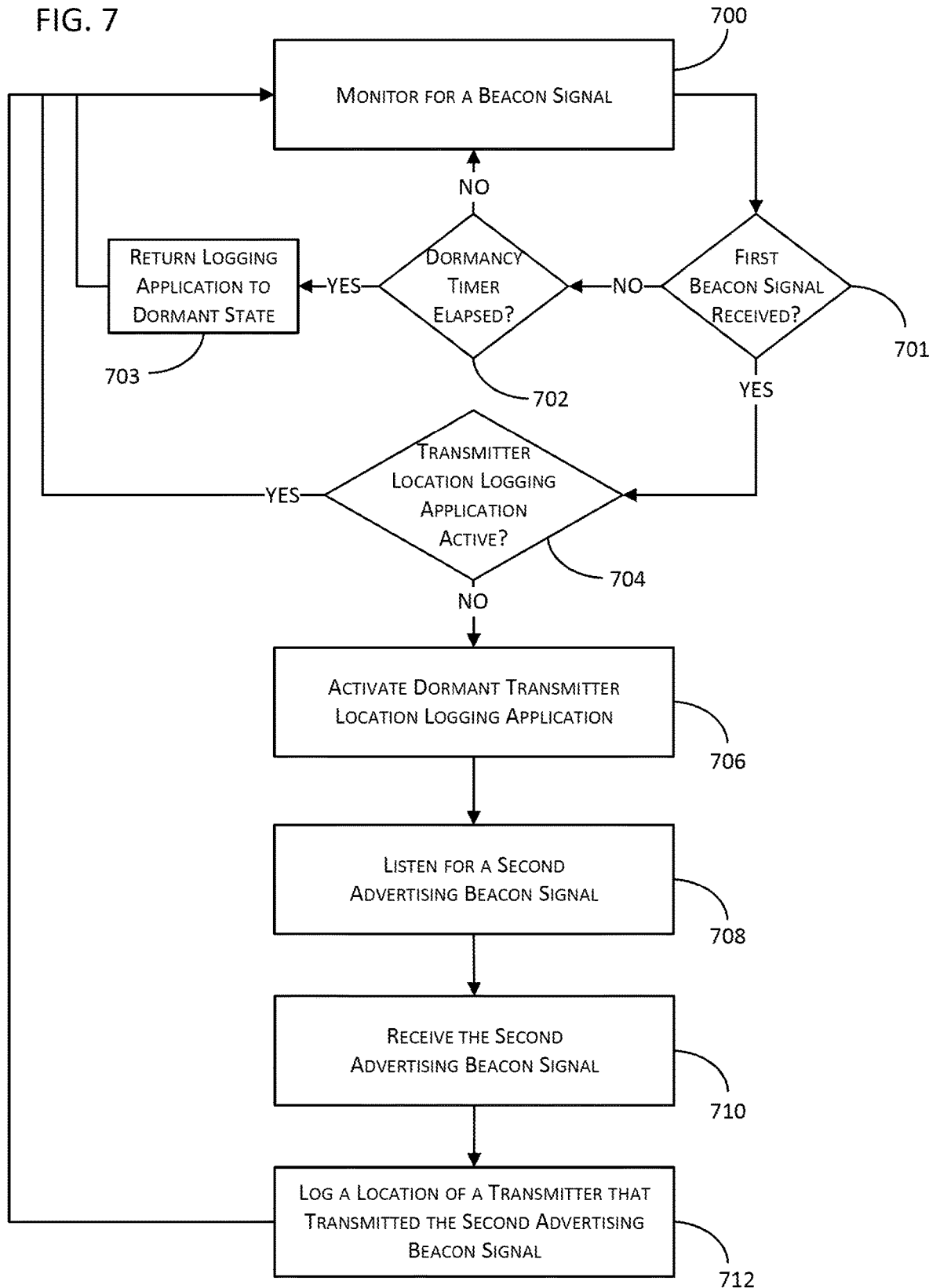
FIG. 7 is a flowchart for a method for logging a location of a beacon transmitter, according to some embodiments.

FIG. 7 is a flowchart for a method for implementing location reporting for a receiving device in communication with a beacon transmitter according to some embodiments. The method of FIG. 7 is described with respect to the system 200; however, the method may be similarly applicable to other devices and systems. At process block 700, the personal wireless device 204 monitors for a beacon signal. In some embodiments, the personal wireless device 204 may monitor for a beacon signal by simply passively monitoring for one or more beacon signals via the network interface 428. As described above, the beacon signal may be transmitted using various communication protocols, which may be monitored via the personal wireless device. At process block 701, the personal wireless device determines whether a first beacon signal has been received, such as one of the first beacon signals 500. In response to determining that the first beacon signal was not received, the personal wireless device then determines whether a dormancy timer has elapsed at process block 702. The dormancy timer may be a time period since the personal wireless device last received a first beacon signal. In some embodiments, the dormancy timer has a predetermined value, such as ten seconds. However, time periods of more than ten seconds or less than ten seconds are also contemplated. In response to determining that the dormancy timer has not elapsed, the personal wireless device 204 continues to monitor for a beacon signal at process block 700. In response to determining that the dormancy timer has elapsed, the personal wireless device 204 returns a transmitter location logging to a dormant state at process block 703. The personal wireless device 204 then continues to monitor for a beacon signal at process block 700.

Responsive to determining that a first beacon signal has been received at process block 701, the personal wireless device 204 determines whether a transmitter location logging application of the personal wireless device 204 is active at process block 704. In some embodiments, responsive to determining that the first beacon signal has been received at process block 701, the personal wireless device 204 also resets the dormancy timer. When the transmitter location logging application is determined to be active, the personal wireless device 204 returns to monitoring for a beacon signal at process block 700.

In response to the personal wireless device 204 determining that the location application is not active, the location logging application is activated at process block 706. In some embodiment, an operating system of the personal wireless device 204 receives the first beacon signal and activates the dormant transmitter location logging application. In other embodiments, the first beacon is a signal using a first open protocol for alerting the transmitter location logging application to the presence of the beacon transmitter 100 transmitting the second advertising beacon signal. In one embodiment, the first beacon signal is structured similarly to the first beacon diagram described above. In one embodiment, the location logging application is stored in a memory of the personal wireless device 204, and is configured to store a location of the personal wireless device 204 when the personal wireless device 204 receiver is activated at process block 706.

The transmitter location logging application of the personal wireless device 204 listens for a second advertising beacon signal at process block 708. For example, to listen, the personal wireless device 204 may execute a software loop that repeatedly checks for a second advertising beacon signal being received by a wireless antenna of the personal wireless device 204. In block 710, the personal wireless device 204 receives the second advertising beacon signal, such as one of the second beacon signals described above, from the transmitting device.

In block 712, a location of the beacon transmitter 100 that transmitted the second advertising beacon signal is logged by the transmitter location logging application of the personal wireless device 204. For example, upon receipt of one of the second advertising beacon signals including the beacon data, the personal wireless device 204 determines the transmitter identifier of the beacon transmitter 100 based on beacon data, and determines the location of the personal wireless device 204 based on an output from a global navigation satellite system (GNSS) receiver of the personal wireless device 204. While GNSS is described as an example of location detection, embodiments will include other forms of location awareness, such as registration of location (e.g., stored in a memory as part of an initial set-up) or location detection through detection of wireless networks, without departing from the scope and intent of the present disclosure. The personal wireless device 204 logs (e.g., stores in a memory) the determined location with the transmitter identifier of the beacon transmitter 100 such that the location of the personal wireless device 204 is logged as the location of the beacon transmitter.

In some embodiment, the additional information may be logged by the personal wireless device 204 for the beacon transmitter 100 at process block 712. For example, additional information from the beacon data, including one or more of a user identifier, user contact information, timestamp, state of charge of the battery 110, and other status information may be logged for the beacon transmitter 100 at process block 712. Furthermore, additional information from the personal wireless device 204 may be logged for the beacon transmitter 100 at process block 712, such as a timestamp (e.g., when not provided as part of the beacon data) and receiving a device identifier that identifies the personal wireless device 204 or the user thereof. The data that is logged by the personal wireless device 204 in block 712 may be referred to as logged data from the beacon transmitter 100.

In some embodiments, the personal wireless device 204 further sends the logged data, including the transmitter identifier and location of the beacon transmitter 100 to the location server 208 for storage and processing. In some embodiments, the receiving device sends the logged data to the location server 208 each time process block 712 is executed. In other embodiments, the personal wireless device 204 may be configured to delay sending the logged data when the receiving device has already sent similar data recently (e.g., within the past minute, ten minutes, or hour) to limit data transmission and conserve power. In some embodiments, delaying transmission of the logged data enables the receiving device to obtain further logged data from other beacon transmitters using a similar process and to bundle the logged data for multiple beacon transmitters for a single transmission.

In some embodiments, the process described in FIG. 7 further includes, during execution of steps 700-712, the personal wireless device 204 waiting through a first number of transmission repetitions of the beacon transmitter 100 spaced at a first repeat interval, after the first number or transmission repetitions, waiting during a transition interval, and, thereafter, receiving the second advertising beacon signal through a second number of transmission repetitions of the beacon transmitter 100 spaced at a second repeat interval.

In some embodiments, the method of FIG. 7 occurs in the background of the personal wireless device 204 such that the receiving and logging of information related to the beacon transmitter 100 occurs without particular notifications to a user of the personal wireless device 204 of the particular receiving and logging. For example, although the transmitter location logging application may be activated from a dormant state, the activation may occur in the background such that an application on the personal wireless device 204 is not interrupted or altered to provide a notification of the activation. Similarly, the logged data may be logged on the personal wireless device 204 and sent to the location server 208 for logging without a particular notification of these actions being provided to the user of the personal wireless device 204.

In some embodiments, in addition to being able to be activated upon receipt of the first beacon signal, the transmitter location logging application of the personal wireless device 204 may also be activated in response to receiving a user activation input through a user interface. For example, the user activation input may include a user input indicating a selection of the transmitter location logging application for execution. In response to the user activation input, the receiving device proceeds to block 708-712, as described above.

Figure 8:
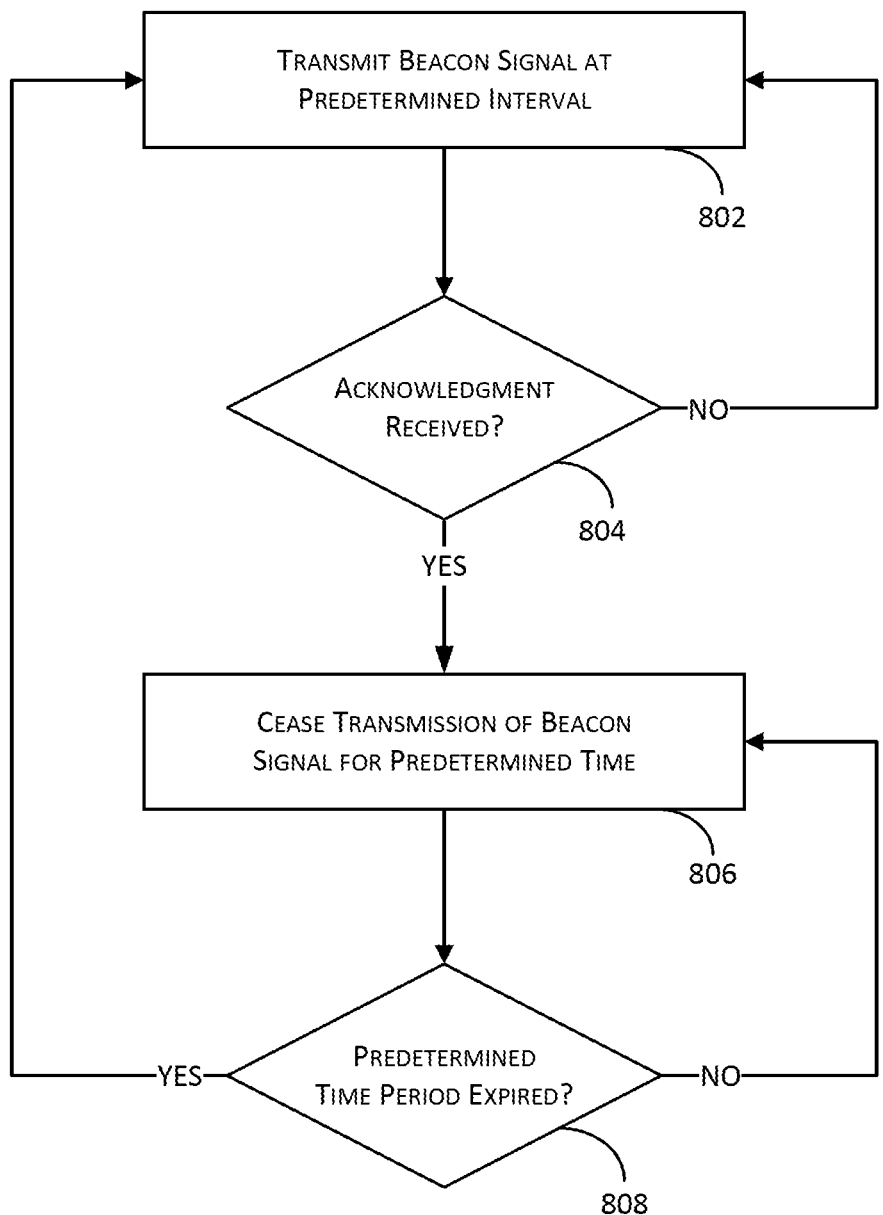
FIG. 8 is a flowchart for a method for modifying transmission of a beacon signal based on receiving an acknowledgement signal, according to some embodiments.

In some examples, the wireless beacon 100 may have limited power availability, such as when the wireless beacon is powered via a coin cell battery, or other low-power power supply. As the transmission of the beacon signal requires power, constant transmission of the beacon signal may put a burden on the power supply of the beacon transmitter 100. In some examples, the rate of transmission may be modified based on the available power (e.g. transmit the first beacon signal every two seconds for low-power power supplies, and one second for higher-power power supplies), this can be cumbersome to program, and could result in the transmission intervals being too large resulting in the personal wireless device 204 not receiving the first beacon signal when the personal wireless device 204 is in communicative range of the wireless beacon 100. Thus, blindly varying the transmission interval of the beacon transmitter 100 may not always be applicable or advisable. Turning now to FIG. 8, a process 800 is shown for temporarily ceasing transmission based on the beacon transmitter 100 receiving an indication that the beacon signal has been received by a personal wireless device 204.

At process block 802, the beacon transmitter 100 transmits a beacon signal at a predetermined interval as described above. For example, the beacon transmitter 100 may transmit via the wireless transceiver 140 a beacon signal every 100 ms. In other examples, the beacon transmitter 100 may transmit a beacon signal every 1 second. In still further examples, the beacon transmitter 100 may transmit a beacon signal every 10 seconds. However, it is contemplated that transmission intervals of less than 100 ms, and greater than 10 seconds are also contemplated, along with all values in between. At process block 804, the beacon transmitter 100 determines whether the beacon transmitter 100 has received an acknowledgement signal. In some embodiments, the acknowledgment signal is received from the personal wireless device 204, and the personal wireless device 204 sends the acknowledgment signal based on the personal wireless device 204 receiving the beacon signal, as described in more detail below. The acknowledgment signal may be received via the wireless transceiver 140. In some embodiments, the acknowledgment signal includes the identifier of the beacon transmitter 100 (e.g., UUID 518) such that the beacon transmitter 100 can determine that the acknowledgment signal was in response to a beacon signal transmitted by that particular beacon transmitter (e.g., by comparing the received UUID to a UUID stored in the memory 160).

In response to determining that no acknowledgement signal has been received, the transmitter beacon 100 continues to transmit the beacon signal at the predetermined interval at process block 802. In response to determining that the acknowledgement signal is received, the beacon transmitter stops transmitting the beacon signal for a predetermined time at process block 806. In some embodiments, the predetermined time may be 60 seconds. However, predetermined times of less than 60 seconds or greater than 60 seconds are contemplated. In some embodiments, a user may be able to set the predetermined time via the personal wireless device 204. In other embodiments, the predetermined time may be set during manufacturing. In still further embodiments, the predetermined time may be set based on the power source available to the beacon transmitter 100. For example, where the beacon transmitter 100 is coupled to a low-power power source (e.g. a coin cell battery), the predetermined time may be a higher value than where the beacon transmitter 100 is coupled to a high-power power source (e.g. battery pack of a power tool). This variable time allows for more power to be saved when the beacon transmitter 100 is coupled to a low-power power supply.

In embodiments where the beacon transmitter 100 may use cellular communication and/or location monitoring, the predetermined time period may be still higher to substantially reduce the amount of power consumed by the beacon transmitter 100. Due to the higher power requirements to read location data, and/or communicate via cellular communication, reducing a single cellular transmission can result in power savings equivalent to thousands of communications using BLE.

At process block 808, the beacon transmitter 100 determines whether the predetermined time period has expired. In response to determining that the predetermined time period has not expired, the beacon transmitter continues to not transmit the beacon data at process block 806. In response to the beacon transmitter 100 determining that the predetermined time period has expired, the beacon transmitter resumes transmitting the beacon signal at predetermined intervals at process block 802.

In some embodiments, the wireless transceiver 140 is configured to receive signals from global navigation satellites such that the controller 125 and wireless transceiver 140 function as a GNSS receiver configured to determine a location of the beacon transmitter 100. Additionally, the wireless transceiver 140 is configured to communicate beacon signals via a short-range wireless communication protocol (e.g., Bluetooth or BLE) to a personal wireless device as described above (see FIG. 7), and also configured to periodically transmit its location determined based on the received signals from the global navigation satellites and identifier (e.g., UUID) via a long-range wireless communication protocol (e.g., cellular) to the location server 208 (i.e., bypassing the personal wireless device). Accordingly, even when no personal wireless device is nearby the beacon transmitter 100, the location server 208 is able to receive and log location information for the beacon transmitter 100.

However, in such embodiments, communicating via cellular communication, and functioning as a GNSS receiver significantly increases the power consumption of the beacon transmitter 100. For example, a single cellular transmission can use similar amount of power as hundreds or thousands of beacon signals transmitted using BLE.

Accordingly, in some embodiments, in addition to temporarily ceasing transmission of a beacon signal using the wireless protocol over which the acknowledgment signal was received (e.g., ceasing beacon signals over BLE), the beacon transmitter 100 also temporarily ceases transmission of a location beacon signal that would otherwise be sent using a long-range communication protocol (e.g., cellular). Thus, because a short range beacon signal is acknowledged as received by a portable wireless device, the beacon transmitter 100 may obtain power savings by temporarily ceasing transmission of beacon signals over two protocols.

As an example implementation, in some embodiments, the process 800 further includes determining, by the beacon transmitter, a location of the beacon transmitter based on signals received from global navigation satellites. For example, as noted, the controller 125 and wireless transceiver 140 may function as a GNSS receiver configured to determine a location of the beacon transmitter 100. The beacon transmitter further transmits, periodically, a location beacon signal at a second repeat interval that is longer than the first repeat interval, the location beacon signal including the location of the beacon transmitter. For example, the beacon transmitter 100 may transmit the location beacon signal periodically, but at a rate lower (e.g., every hour, every four hours, every twenty-four hours, etc.) than the rate at which the beacon signal (block 802) is transmitted. The beacon transmitter further stops transmission of the location beacon signal for a second predetermined amount of time based on the acknowledgement signal. For example, the second predetermined amount of time is longer than the predetermined time of block 806. In some examples, the second predetermined amount of time is equal to the second repeat interval (e.g., an hour, four hours, twenty-four hours, etc.). In some examples, to stop the transmission of the location beacon signal for the second predetermined amount of time, the beacon transmitter skips the next planned transmission (i.e., the second predetermined amount of time is the equal to the time until the next scheduled transmission plus the second repeat interval). In yet other embodiments, the second predetermined amount of time is another selected time period. The beacon transmitter 100 then determines that the second predetermined amount of time has expired, and then resumes periodic transmission of the location beacon signal based on determining the second predetermined amount of time has expired. When resuming the periodic transmission, the location beacon signal may be again transmitting the location beacon signal periodically at the second repeat interval, or at a different repeat interval (still longer than the first repeat interval).

In some embodiments, the beacon signal (of block 802) is transmitted according to a first protocol and at a first power level (e.g., according to Bluetooth or BLE), and the location beacon signal is transmitted according to a second protocol and at a second power level (e.g., according to a cellular protocol), where the first protocol is different than the second protocol, and where the first power level is lower than the second power level. Accordingly, because the beacon signal (of block 802) is acknowledged as received by a portable wireless device 204, the beacon transmitter 100 may obtain power savings by temporarily ceasing transmission of signals over two protocols (e.g., beacon signal over BLE and location beacon signal over cellular).

Figure 9:
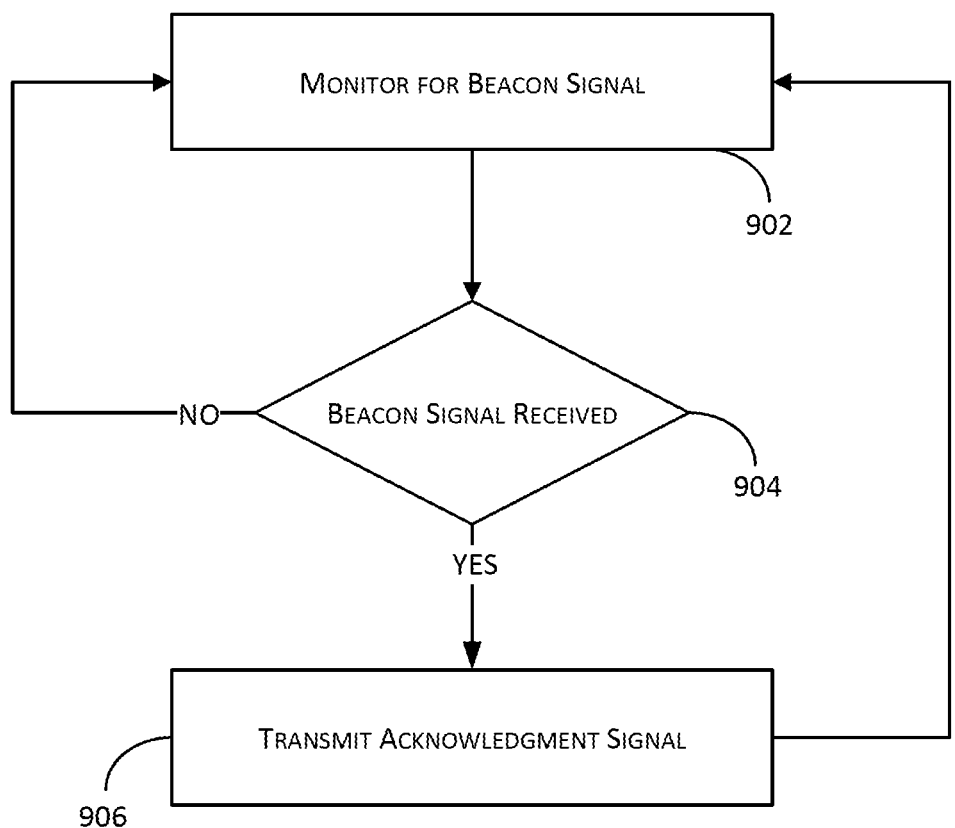
FIG. 9 is a flowchart for a method for transmitting an acknowledgment signal to a beacon transmitter, according to some embodiments.

Turning now to FIG. 9, a process 900 for providing an acknowledgment signal to a beacon transmitter is shown, according to some embodiments. In one embodiment, the process 900 is performed by the personal wireless device 204, however other devices, such as computer system 400 may also perform the process 900. At process block 902, the personal wireless device 204 monitors for a beacon signal, such as described above. At process block 904, the personal wireless device 204 determines whether a beacon signal has been received. In response to no beacon signal being received, the personal wireless device 204 continues to monitor for a beacon signal at process block 902. In response to receiving a beacon signal, the personal wireless device transmits the acknowledgment signal at process block 906. In some embodiments, the personal wireless device 204 includes the unique ID (e.g. UUID 518) of the received beacon signal in the acknowledgment signal. By including the unique ID in the acknowledgment signal, the personal wireless device 204 can ensure that the correct beacon transmitter receives the acknowledgment signal. Upon transmitting the acknowledgment signal, the personal wireless device 204 continues to monitor for beacon signals at process block 902.

In some embodiments, in addition to transmitting an acknowledgment signal, in block 906, the personal wireless device 204 also logs a location of the beacon transmitter 100 that transmitted the beacon signal, as described with respect to block 712.

In some embodiments, the process 900 is used in conjunction with the method of FIG. 7. For example, the process 900 may be used in place of blocks 708 and 710 of FIG. 7, such that the block 902 is entered instead of block 708, and, after block 906, the method continues to block 712 (rather than returning back to block 902 like shown in FIG. 9). Thus, after a second beacon signal is received by the personal wireless device 204, the personal wireless device 204 transmits an acknowledgment signal to the beacon transmitter 100, which then, in accordance with the flow chart of FIG. 8, ceases transmission of beacon signals (e.g., one or both of the first and second beacon signals) for a predetermined time.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 400 may be transmitted to computer system 400 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present technology may be practiced with other computer system configurations.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the technology embrace all such modifications and changes and, accordingly, the above description to be regarded in an illustrative rather than a restrictive sense.

Thus, the technology provides, among other things, a systems and methods for location logging of transmission devices. Various features and advantages of the technology are set forth in the following claims.

What is claimed is:

1. A method for temporarily suspending transmission of a beacon signal, the method comprising:
    transmitting repeatedly, by a beacon transmitter, a first beacon signal through a first number of transmission repetitions spaced at a first repeat interval;
    receiving, at the beacon transmitter, an acknowledgement signal, wherein the acknowledgement signal is transmitted by a wireless device in response to receiving the first beacon signal;
    stopping, by the beacon transmitter, transmission of the first beacon signal for a first predetermined amount of time based on receipt of the acknowledgement signal, wherein the first predetermined amount of time is based on a capacity of a power supply connected to the beacon transmitter such that the first predetermined amount of time is a higher value when the capacity of the power supply is low than when the capacity of the power supply is high;
    determining, by the beacon transmitter, that the first predetermined amount of time has expired; and
    resuming repeated transmission, by the beacon transmitter, of the first beacon signal based on determining that the first predetermined amount of time has expired.

2. The method of claim 1, wherein the first predetermined amount of time is at least sixty seconds.

3. The method of claim 1, further comprising:
    determining, by the beacon transmitter, a location of the beacon transmitter based on signals received from global navigation satellites;
    transmitting periodically, by the beacon transmitter, a location beacon signal at a second repeat interval that is longer than the first repeat interval, wherein the location beacon signal includes the location of the beacon transmitter, and wherein periodically transmitting the location beacon signal occurs concurrently with repeatedly transmitting the first beacon signal;

stopping transmission, by the beacon transmitter, of the location beacon signal for a second predetermined amount of time based on the acknowledgement signal;

determining, by the beacon transmitter, that the second predetermined amount of time has expired; and resuming periodic transmission, by the beacon transmitter, of the location beacon signal based on determining the second predetermined amount of time has expired.

4. The method of claim 3, wherein the first beacon signal is transmitted according to a first protocol and at a first power level, and the location beacon signal is transmitted according to a second protocol and at a second power level; and wherein the first protocol is different than the second protocol, and the first power level is less than the second power level.

5. The method of claim 3, wherein resuming periodic transmission includes transmitting periodically, by the beacon transmitter, the location beacon signal at the second repeat interval.

6. The method of claim 3, further comprising:

determining, by the wireless device and in response to receiving the first beacon signal from the beacon transmitter, a location of the wireless device; and logging, by the wireless device, the location of the wireless device as a logged location of the beacon transmitter.

7. A beacon transmitter comprising:

a wireless transceiver; and an electronic controller coupled to the wireless transceiver, and configured to:

repeatedly transmit, via the wireless transceiver, a first beacon signal through a first number of transmission repetitions spaced at a first repeat interval, receive an acknowledgment signal via the wireless transceiver, wherein the acknowledgment signal is transmitted by a personal wireless device in response to receiving the first beacon signal, stop transmission of the first beacon signal for a first predetermined amount of time based on receipt of the acknowledg ment signal, wherein the first predetermined amount of time is based on a capacity of a power supply connected to the beacon transmitter such that the first predetermined amount of time is a higher value when the capacity of the power supply is low than when the capacity of the power supply is high, determine that the first predetermined amount of time has expired, and resume repeatedly transmitting, via the wireless transceiver, the first beacon signal in response to determining that the first predetermined amount of time has expired.

8. The beacon transmitter of claim 7, wherein the acknowledgment signal comprises a beacon ID value associated with the transmitted first beacon signal.

9. The beacon transmitter of claim 7, wherein the electronic controller is further configured to:

determine a location of the beacon transmitter based on signals received from global navigation satellites;

transmit periodically a location beacon signal at a second repeat interval that is longer than the first repeat interval, the location beacon signal includes the location of the beacon transmitter, wherein periodically transmitting the location beacon signal occurs concurrently with repeatedly transmitting the first beacon signal;

stop transmission of the location beacon signal for a second predetermined amount of time in response to receiving the acknowledgment signal;

determine that the second predetermined amount of time has expired; and resume periodic transmission of the location beacon signal in response to determining that the second predetermined amount of time has expired.

10. The beacon transmitter of claim 9, wherein the first beacon signal is transmitted according to a first protocol and at a first power level, and the location beacon signal is transmitted according to a second protocol and at a second power level, and further wherein the first protocol is different than the second protocol, and the first power level is less than the second power level.

11. The beacon transmitter of claim 7, wherein a location of the wireless device is logged as a logged location of the beacon transmitter in response to the first beacon signal being received from the beacon transmitter.

* * * * *